United States Patent
Liu et al.

(10) Patent No.: US 12,050,449 B2
(45) Date of Patent: Jul. 30, 2024

(54) ONLINE MONITORING METHOD OF NUCLEAR POWER PLANT SYSTEM BASED ON ISOLATION FOREST METHOD AND SLIDING WINDOW METHOD

(71) Applicant: Harbin Engineering University, Harbin (CN)

(72) Inventors: Yongkuo Liu, Harbin (CN); Xin Ai, Harbin (CN); Longfei Shan, Harbin (CN); Xueying Huang, Harbin (CN)

(73) Assignee: Harbin Engineering University, Harbin (CN)

( * ) Notice: Subject to any disclaimer, the term of this patent is extended or adjusted under 35 U.S.C. 154(b) by 264 days.

(21) Appl. No.: 17/691,191

(22) Filed: Mar. 10, 2022

(65) Prior Publication Data
US 2022/0291654 A1   Sep. 15, 2022

(30) Foreign Application Priority Data
Mar. 11, 2021   (CN) .......................... 202110263298.5

(51) Int. Cl.
G05B 19/05   (2006.01)

(52) U.S. Cl.
CPC ...... *G05B 19/058* (2013.01); *G05B 2219/161* (2013.01)

(58) Field of Classification Search
CPC ............ G05B 19/058; G05B 2219/161; G05B 23/0221; G05B 23/024; G21D 3/001; G21D 3/04; G06F 30/27; G06F 18/24323
See application file for complete search history.

(56) References Cited

FOREIGN PATENT DOCUMENTS

| CN | 107657288 | * | 10/2017 | ............... G06K 9/62 |
|----|-----------|---|---------|--------------------------|
| CN | 110399935 | * | 8/2019  | ............... G06K 9/62 |

\* cited by examiner

*Primary Examiner* — Christopher E. Everett
*Assistant Examiner* — Tameem D Siddiquee
(74) *Attorney, Agent, or Firm* — Hovey Williams LLP

(57) ABSTRACT

The present disclosure relates to an online monitoring method of a nuclear power plant system based on an isolation forest method and a sliding window method. An isolation forest method used in the present disclosure is an abnormal detection model based on the idea of binary tree division, and has no requirements on the dimension and linear characteristics of monitoring data. In view of the characteristics of strong nonlinearity and high dimension of operation data of the nuclear power plant system, in the process of state monitoring, system abnormalities can be detected more quickly and accurately. In the present disclosure, a sliding window method is used to improve an isolation forest model, so that the improved isolation forest model has the functions of model online updating and real-time state monitoring, and the usability of an isolation forest state monitoring method is enhanced.

1 Claim, 1 Drawing Sheet

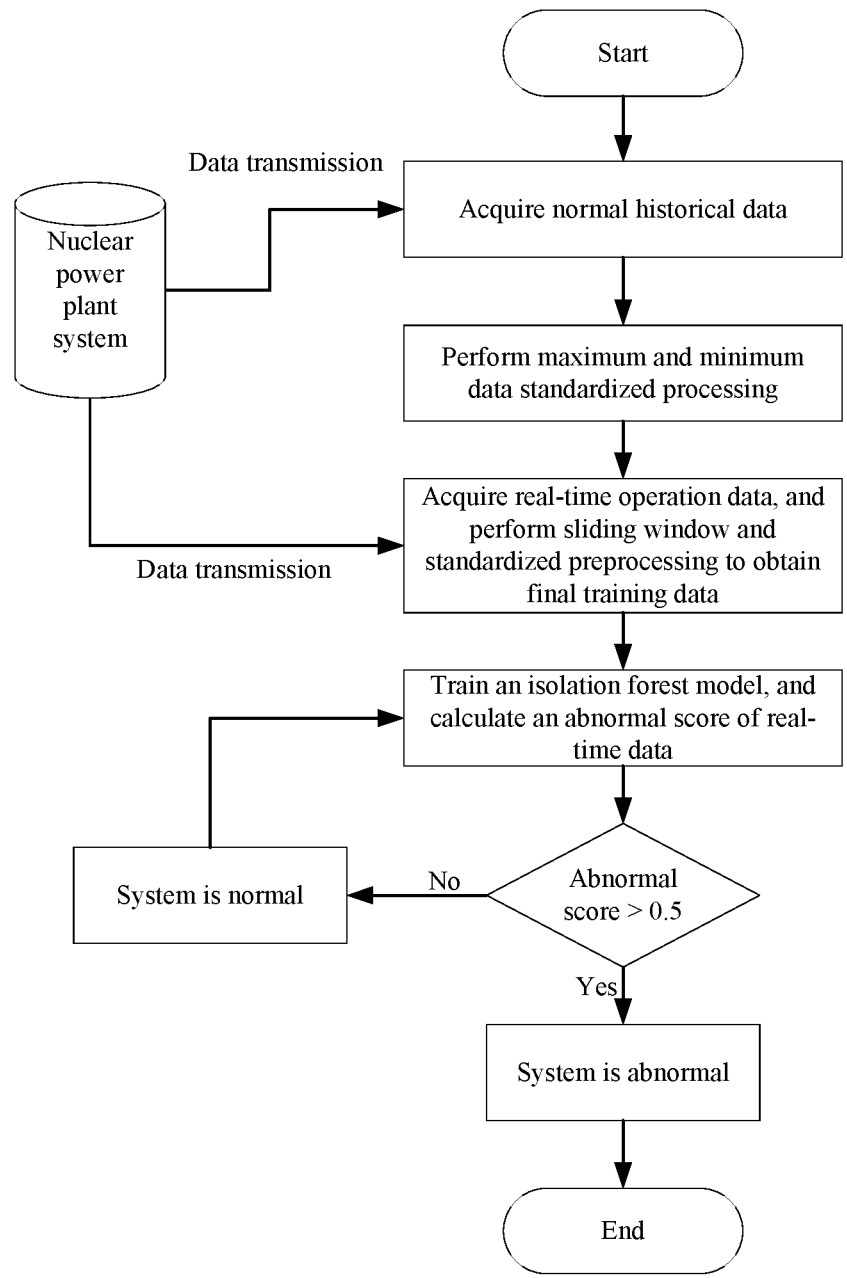

ONLINE MONITORING METHOD OF NUCLEAR POWER PLANT SYSTEM BASED ON ISOLATION FOREST METHOD AND SLIDING WINDOW METHOD

CROSS REFERENCE TO RELATED APPLICATION(S)

This patent application claims the benefit and priority of Chinese Patent Application No. 202110263298.5, filed on Mar. 11, 2021, the disclosure of which is incorporated by reference herein in its entirety as part of the present application.

TECHNICAL FIELD

The present disclosure belongs to the technical field of online state monitoring of a nuclear power plant system, and particularly relates to an online monitoring method of a nuclear power plant system based on an isolation forest method and a sliding window method.

BACKGROUND ART

Safety is an important prerequisite for the development of a nuclear power plant. How to control the risk of the nuclear power plant and ensure the normal operation of nuclear power generating sets is the long-term objective of the nuclear power field. A fault monitoring and diagnosis technology can effectively help operators to monitor the operating state of the nuclear power plant and identify the occurrence and types of faults in time, so this technology has always been highly valued.

In actual state monitoring of a nuclear power plant system, monitoring based on a threshold method or a principal component analysis method is mostly used. The threshold monitoring method has the problems that there is no clear theoretical guidance for threshold selection, and improper threshold is easy to leak alarms. The principal component analysis monitoring method uses a matrix operation which has low computational efficiency for high-dimensional data, and the principal component analysis method belongs to a linear model which has a poor effect on nonlinear data processing of the nuclear power plant. The isolation forest method is a data-driven anomaly detection algorithm. This algorithm detects abnormal data according to the idea of binary tree division, has high anomaly detection accuracy, and can be adapted to massive and high-dimensional data of the nuclear power plant. However, the isolation forest method is mostly used in offline anomaly detection, which cannot be adapted to online real-time monitoring of the nuclear power plant system.

In conclusion, it is of great practical significance to develop a real-time and accurate online real-time monitoring method of a nuclear power plant system to ensure the safe and reliable operation.

SUMMARY

The objectives of the present disclosure are solving the problems of model online updating and real-time online monitoring of an isolation forest state monitoring method, and providing an online monitoring method of a nuclear power plant system based on an isolation forest method and a sliding window method.

The objective of the present disclosure is realized through the following technical solution, including the following steps:

step 1: acquiring historical operation data of a nuclear power plant in a normal state, and performing standardized preprocessing on the historical operation data of the nuclear power plant in a normal state by a maximum and minimum normalization method, so as to obtain historical operation dimensionless sample data X of the nuclear power plant in a normal state;

step 2: acquiring real-time operation data of the nuclear power plant, performing standardized preprocessing on the real-time operation data of the nuclear power plant by the maximum and minimum normalization method, and adding the real-time operation data of the nuclear power plant after the standardized preprocessing to X by a sliding window method, so as to form training data X', where assuming that a length of the sliding window is T, the historical operation dimensionless sample data X of the nuclear power plant in a normal state is expressed as:

$$X=\{x_1, x_2, \ldots, x_{T-1}, x_T\}$$

after acquiring real-time data $x_t$ of the nuclear power plant, deleting the first data of the sliding window, and adding the new data $x_t$ to the end of the sliding window at the same time, so as to form the training data X':

$$X'=\{x_2, x_3, \ldots, x_T, x_t\};$$

step 3: performing state monitoring by an isolation forest method, inputting the training data X' into an isolation forest model for abnormal detection training, and calculating an abnormal score of the real-time data, so as to realize accurate monitoring of the state of the nuclear power plant system;

step 3.1: performing random sampling on the training data X', constructing an isolated tree model by using the data obtained by random sampling each time, setting a maximum depth of the isolated tree model as l, and integrating all isolated trees into an isolation forest model:

$$l=\text{ceiling }[\log_2(\varphi)]$$

where $\varphi$ represents a number of subsamples, and y=ceiling(x) represents a round-up function, that is, the smallest integer greater than or equal to x is taken;

step 3.2: calculating an average path length c(n) of each isolated tree, calculating a path length h(x) of the real-time data $x_t$ of the nuclear power plant in the isolated tree, and calculating an abnormal score s of the real-time data:

$$c(n) = \begin{cases} 2H(n-1) - \dfrac{2(n-1)}{n} & n > 1 \\ 0 & \text{otherwise} \end{cases},$$

$$s(x, n) = 2^{-\frac{E[h(x)]}{c(n)}},$$

where n represents a sample size contained in a root node of an isolated tree, H(n) represents a harmonic function H(n)=ln(n)+ε, ε=0.5772156649 represents an Euler's constant, h(x) represents a path length of the real-time data $x_t$ of the nuclear power plant in the isolated tree, and E[h(x)] represents an expected value of the path length of the real-time data $x_t$ in all isolated trees of the isolation forest;

step 3.3: if the abnormal score is greater than 0.5, determining that the state of the nuclear power plant system is abnormal at the current moment, and issuing an alarm; otherwise, determining that the state of the nuclear power plant system is normal at the current moment, acquiring the real-time operation data of the next moment, and returning to step 2, so as to realize online real-time monitoring of the nuclear power plant system.

The present disclosure has the following beneficial effects:

The isolation forest method used in the present disclosure is an abnormal detection model based on the idea of binary tree division, and has no requirements on the dimension and linear characteristics of monitoring data. In view of the characteristics of strong nonlinearity and high dimension of operation data of the nuclear power plant system, in the process of state monitoring, system abnormalities can be detected more quickly and accurately. In the present disclosure, the sliding window method is used to improve the isolation forest model, so that the improved isolation forest model has the functions of model online updating and real-time state monitoring, and the usability of the isolation forest state monitoring method is enhanced.

BRIEF DESCRIPTION OF THE DRAWINGS

FIG. 1 is a flow chart of the present disclosure.

DETAILED DESCRIPTION OF THE EMBODIMENTS

The present disclosure will be further described below with reference to the accompanying drawings.

The present disclosure relates to an online state monitoring method of a nuclear power plant system, and particularly relates to an online monitoring method of a nuclear power plant system based on an isolation forest method and a sliding window method. An objective of the present disclosure is to provide a real-time and accurate online monitoring method of a nuclear power plant system. The method can solve the problems of model online updating and real-time online monitoring of the isolation forest state monitoring method.

The objective of the present disclosure is realized as follows:
  step 1: historical operation data of a nuclear power plant in a normal state is acquired as training data X;
  step 2: standardized preprocessing is performed on the training data by a maximum and minimum normalization method, so as to obtain dimensionless sample data of an online monitoring model;
  step 3: standardized preprocessing is performed on the real-time operation data of the nuclear power plant according to maximum and minimum values in step 2, and the real-time operation data is added to the training data by a sliding window method, so as to form training data X';
  step 4: state monitoring is performed by an isolation forest method, the training data X' is input into an isolation forest model for abnormal detection training, and an abnormal score of the real-time data is calculated, so as to realize accurate monitoring of the state of the nuclear power plant system; and
  step 5: the real-time operation data of the nuclear power plant at the next moment is acquired, steps 3, 4 and 5 are repeated, and online real-time monitoring of the nuclear power plant system is realized by the sliding window method in step 3.

The sliding window method in step 3 is as follows:
assuming that a length of the sliding window is T, the training data X composed of normal data can be expressed as:

$$X = \{x_1, x_2, \ldots, x_{T-1}, x_T\};\text{ and}$$

after real-time data $x_t$ of the nuclear power plant is acquired, the first data of the sliding window is deleted, and the new data $x_t$ is added to the end of the sliding window at the same time, so as to form the training data X':

$$X' = \{x_2, x_3, \ldots, x_T, x_t\};$$

The isolation forest state monitoring method in step 4 is as follows:
1) random sampling is performed on the training data, an isolated tree model is constructed by using the data obtained by random sampling each time, a maximum depth of the isolated tree model is set as l, and all isolated trees are integrated into an isolation forest model:

$$l = \text{ceiling }[\log_2(\varphi)],$$

where $\varphi$ represents a number of subsamples, and y=ceiling(x) represents a round-up function, that is, the smallest integer greater than or equal to x is taken;

2) an average path length c(n) of each isolated tree is calculated, a path length h(x) of the real-time data $x_t$ of the nuclear power plant in the isolated tree is calculated, and an abnormal score s of the real-time data is calculated:

$$c(n) = \begin{cases} 2H(n-1) - \dfrac{2(n-1)}{n} & n > 1 \\ 0 & \text{otherwise} \end{cases},$$

$$s(x, n) = 2^{-\frac{E[h(x)]}{c(n)}},$$

where n represents a sample size contained in a root node of an isolated tree, H(n) represents a harmonic function H(n)=ln(n)+ε, ε=0.5772156649, represents an Euler's constant, h(x) represents a path length of the real-time data $x_t$ of the nuclear power plant in the isolated tree, and E[h(x)] represents an expected value of the path length of the real-time data $x_t$ in all isolated trees of the isolation forest; and 3) if the abnormal score is greater than 0.5, it is determined that the state of the nuclear power plant system is abnormal, and if the abnormal score is less than or equal to 0.5, the system is normal.

The present disclosure has the following beneficial effects:

The isolation forest method used in step 4 in the technical solution of the present disclosure is an abnormal detection model based on the idea of binary tree division, and has no requirements on the dimension and linear characteristics of monitoring data. In view of the characteristics of strong nonlinearity and high dimension of operation data of the nuclear power plant system, in the process of state monitoring, system abnormalities can be detected more quickly and accurately. The sliding window method is used in step 3 in the technical solution of the present disclosure to improve the isolation forest model, so that the improved isolation forest model has the functions of model online updating and real-time state monitoring, and the usability of the isolation forest state monitoring method is enhanced.

Embodiment 1

The software of the present disclosure takes PyCharm as a development platform and is compiled by Python3.6 language, and main functions are:

After a system is connected, historical data of a nuclear power plant during normal operation and real-time online operation data are input and trained to obtain an improved isolation forest online state monitoring model, and then, real-time online monitoring of the nuclear power plant system is performed. Monitoring results are displayed in a main interface for state monitoring in real time in the form of text and curves.

As shown in FIG. 1, an online monitoring method of a nuclear power plant system based on an improved isolation forest method in the present disclosure includes the following steps:

(1) PCTRAN simulation software is used to acquire historical data of a nuclear power plant during steady-state normal operation as training data X;

(2) in order to reduce the influence of noise and dimension, dimensionless normalization is performed on the training data by a maximum and minimum standardized method;

(3) standardized preprocessing is performed on the real-time operation data of the nuclear power plant according to maximum and minimum values in step (2), and the real-time operation data is added to the training data by a sliding window method, so as to form training data X';

the realization process of the sliding window method is as follows: assuming that a length of the sliding window is T, the training data X composed of normal data can be expressed as:

$$X = \{x_1, x_2, \ldots, x_{T-1}, x_T\};$$

after real-time data $x_t$ of the nuclear power plant is acquired, the first data of the sliding window is deleted, and the new data $x_t$ is added to the end of the sliding window at the same time, so as to form the training data X':

$$X' = \{x_2, x_3, \ldots, x_T, x_t\};$$

(4) state monitoring is performed by an isolation forest method, the training data X' is input into the isolation forest model for abnormal detection training, and an abnormal score of real-time data is calculated, so as to obtain an online monitoring result;

the realization process of the isolation forest state monitoring method is as follows:

1) random sampling is performed on the training data, an isolated tree model is constructed by using the data obtained by random sampling each time, a maximum depth of the isolated tree model is set as l, and all isolated trees are integrated into an isolation forest model:

$$l = \text{ceiling}[\log_2(\varphi)],$$

where $\varphi$ represents a number of subsamples, and $y = \text{ceiling}(x)$ represents a round-up function, that is, the smallest integer greater than or equal to x is taken;

2) an average path length c(n) of each isolated tree is calculated, a path length h(x) of the real-time data $x_t$ of the nuclear power plant in the isolated tree is calculated, and an abnormal score s of the real-time data is calculated:

$$c(n) = \begin{cases} 2H(n-1) - \frac{2(n-1)}{n} & n > 1 \\ 0 & \text{otherwise} \end{cases},$$

$$s(x, n) = 2^{-\frac{E[h(x)]}{c(n)}},$$

where n represents a sample size contained in a root node of an isolated tree, H(n) represents a harmonic function H(n)=ln(n)+ε, ε=0.5772156649 represents an Euler's constant, h(x) represents a path length of the real-time data $x_t$ of the nuclear power plant in the isolated tree, and E[h(x)] represents an expected value of the path length of the real-time data $x_t$ in all isolated trees in the isolation forest;

3) if the abnormal score is greater than 0.5, it is determined that the state of the nuclear power plant system is abnormal, and if the abnormal score is less than or equal to 0.5, the system is normal; and (5) the real-time operation data of the nuclear power plant at the next moment is acquired, and steps (3), (4) and (5) are repeated.

The above description is merely preferred embodiments of the present disclosure and is not intended to limit the present disclosure, and various changes and modifications of the present disclosure may be made by those skilled in the art. Any modifications, equivalent substitutions, improvements, and the like made within the spirit and principle of the present disclosure should be included within the protection scope of the present disclosure.

What is claimed is:

1. An online monitoring method of a nuclear power plant system based on an isolation forest method and a sliding window method, comprising the following steps:

step 1: acquiring historical operation data of a nuclear power plant in a normal state, and performing standardized preprocessing on the historical operation data of the nuclear power plant in a normal state by a maximum and minimum normalization method, so as to obtain historical operation dimensionless sample data X of the nuclear power plant in a normal state;

step 2: acquiring real-time operation data of the nuclear power plant, performing standardized preprocessing on the real-time operation data of the nuclear power plant by the maximum and minimum normalization method, and adding the real-time operation data of the nuclear power plant after the standardized preprocessing to X by a sliding window method, so as to form training data X', wherein assuming that a length of a sliding window is T, the historical operation dimensionless sample data X of the nuclear power plant in a normal state is expressed as:

$$X = \{x_1, x_2, \ldots, x_{T-1}, x_T\}$$

after acquiring the real-time operation data $x_t$ of the nuclear power plant, deleting a first data of the sliding window, and adding the real-time operation data $x_t$ to the end of the sliding window at the same time, so as to form the training data X':

$$X' = \{x_2, x_3, \ldots, x_T, x_t\};$$

step 3: inputting the training data X' into an isolation forest model for abnormal detection training, and calculating an abnormal score of the real-time operation data comprising:

step 3.1: performing random sampling on the training data X' multiple times, constructing an isolated tree by using data obtained from each random sampling, setting a maximum depth of the isolated tree as 1, and integrating a plurality of isolated trees into the isolation forest model:

$$l = \text{ceiling}[\log_2(\varphi)],$$

wherein $\varphi$ represents a number of subsamples, and y=ceiling(x) represents a round-up function, that is, the smallest integer greater than or equal to x is taken;

step 3.2: calculating the abnormal score of the real-time operation data based on the isolation forest model:

$$c(n) = \begin{cases} 2H(n-1) - \dfrac{2(n-1)}{n} & n > 1 \\ 0 & \text{otherwise} \end{cases},$$

$$s(x, n) = 2^{-\frac{E[h(x)]}{c(n)}},$$

wherein n represents a sample size contained in a root node of the isolated tree, c(n) represents an average path length of the plurality of isolated trees, H(n) represents a harmonic function, $H(n)=\ln(n)+\varepsilon$, $\varepsilon=0.5772156649$ represents an Euler's constant, h(x) represents a path length of the real-time operation data $x_t$ of the nuclear power plant in the isolated tree, E[h(x)] represents an expected value of the path length of the real-time operation data $x_t$ in the plurality of isolated trees of the isolation forest, and s represents the abnormal score of the real-time operation data; and step 3.3: if the abnormal score is greater than 0.5, determining that a state of the nuclear power plant system is abnormal at a current moment, and issuing an alarm; otherwise, determining that the state of the nuclear power plant system is normal at the current moment, acquiring the real-time operation data of a next moment, and returning to step 2; and step 4: monitoring, by the isolation forest model, the state of the nuclear power plant system based on the abnormal score to realize online real-time monitoring for the state of the nuclear power plant system.

* * * * *